UNITED STATES PATENT OFFICE.

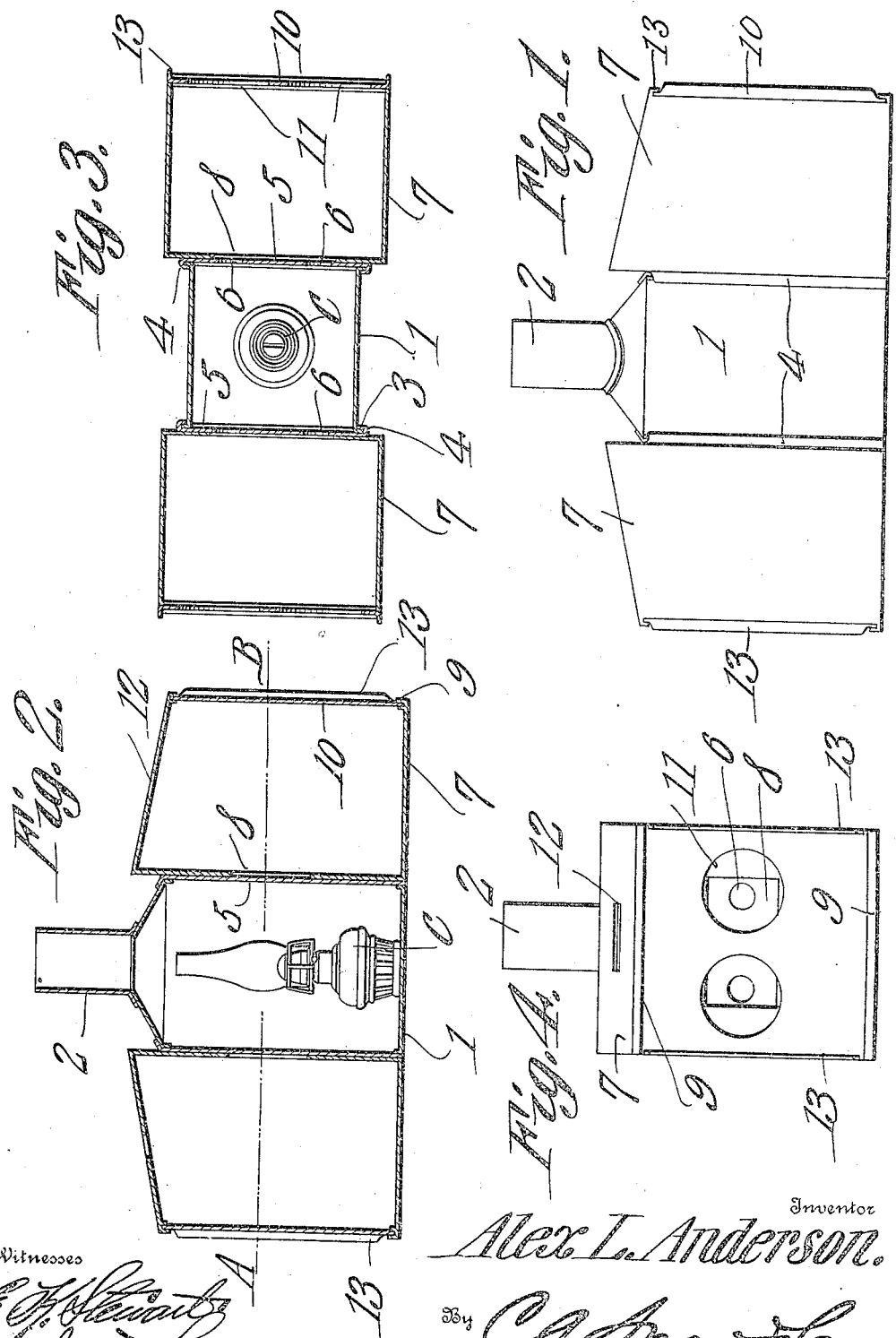

ALEX L. ANDERSON, OF BEATRICE, NEBRASKA.

EGG-TESTER.

952,174.     Specification of Letters Patent.     Patented Mar. 15, 1910.

Application filed September 16, 1909. Serial No. 518,046.

*To all whom it may concern:*

Be it known that I, ALEX L. ANDERSON, a citizen of the United States, residing at Beatrice, in the county of Gage and State of Nebraska, have invented a new and useful Egg-Tester, of which the following is a specification.

This invention relates to devices for use in testing eggs and its object is to provide a simple, durable and compact device of this character formed of few parts and by means of which a number of eggs can be simultaneously tested.

Another object is to provide a device of this character which is easy to manipulate and which is so constructed as to permit the eggs to be quickly placed therein and removed therefrom, it being possible to hold them in the hands during the test.

With these and other objects in view, the invention consists of certain novel details of construction and the combinations of parts hereinafter more fully described and pointed out in the claims.

In the accompanying drawings the preferred form of the invention has been shown.

In said drawings:—Figure 1 is a side elevation of the device. Fig. 2 is a vertical longitudinal section therethrough. Fig. 3 is a horizontal section taken on the line A—B, Fig. 2. Fig. 4 is an end elevation.

Referring to the figures by characters of reference, 1 designates an intermediate casing constituting the housing of a lamp C, the top of the casing being provided with a chimney 2 for the escape of the gases generated by the lamp. Opposite sides of the casing 1 are open and are provided with laterally extending guide flanges 3, designed to be slidably engaged by inturned flanges 4 formed along the side edges of slides 5. Each of these slides has a pair of circular openings 6 therein of slightly less diameter than an egg and located at points about midway between the upper and lower ends of the adjustable slide.

The casing 1 is designed to be interposed between oppositely disposed similar egg-receiving casings 7, each of which is provided in one wall with an opening 8 of such size that when said wall is placed against one of the slides 5, both of the openings 6 will be exposed within the opening 8. That side of the casing 7 opposite the apertured wall of the casing is open and is provided along the top and bottom thereof with guide cleats 9 between which is mounted a slide 10. This slide has two circular openings 11 therein of sufficient size to receive the arms of the operator. The top of each casing 7 is inclined upward in the direction of the apertured wall and has a peep opening 12 through which the contents of the casing 7 can be seen. Flanges 13 may be formed at the sides of each slide 10 and constitute handles whereby said slide can be conveniently manipulated.

In using the device herein described, a lamp is lighted and placed within the intermediate casing 1. The two slides 5 are then placed upon the casing so as to close the open faces thereof and the casings 7 are then placed at opposite sides of the casing 1 so as to expose the openings 6 within the openings 8. The operator then grasps an egg in each hand and inserts the hands into the openings 11 in one of the slides 10. He is thus enabled to hold the eggs in the smaller openings 6 and by looking through the opening 12 in the top of the casing 7 the eggs will be visible and, if they are good, will appear translucent. By having two casings 7 located at opposite sides of the lamp, two persons can be engaged in testing eggs at the same time, the one lamp being used by both of them.

It is of course to be understood that lamps of different sizes can be used within the device.

It is always desirable to hold eggs between the sight opening and the burner of the lamp so that the light rays can be more plainly seen. For this reason the slides 5 have been slidably mounted so as to be readily shifted vertically to bring the egg receiving openings in a line with the sight opening 12 and the burner of the lamp contained within the casing 1.

It is of course to be understood that various changes may be made in the construction and arrangement of the parts without departing from the spirit or sacrificing the advantages of the invention.

What is claimed is:—

1. A device of the class described including a casing having a smoke outlet, a lamp within said casing, a closure slidably mounted upon one face of said casing, said closure having egg receiving openings therein, a casing having an apertured wall bearing against said closure, the egg receiving openings being exposed within the aperture in said wall, there being a sight opening within the top of said last mentioned casing, said sight opening and the egg receiving opening being in a line with the burner of the lamp.

2. A device of the class described including a casing having a chimney, a lamp within said casing, slidable closures mounted on opposite faces of the said casing, each closure having an egg-receiving opening, oppositely disposed casings having apertured walls bearing against the respective closures, the egg-receiving openings being visible through the apertures in said walls, each of said oppositely disposed casings being provided with a sight opening, and a closure slidably mounted upon each of said last mentioned casings and having arm-receiving openings therein.

3. A device of the class described including a casing having a smoke outlet, a lamp within said casing, a closure slidably mounted upon one face of said opening and having egg receiving openings, a casing having an apertured wall bearing against the closure, the egg receiving openings being exposed within said aperture, said casing being provided with a sight opening in the top thereof, a slide constituting a closure for said casing, said slide having arm receiving openings therein, the sight opening and the egg receiving opening being disposed on a line with the burner of the lamp within the first mentioned casing.

In testimony that I claim the foregoing as my own, I have hereto affixed my signature in the presence of two witnesses.

ALEX L. ANDERSON.

Witnesses:
O. P. FULTON,
FLORENCE BUEHLER.